US012634267B2

(12) United States Patent
Simms et al.

(10) Patent No.: US 12,634,267 B2
(45) Date of Patent: May 19, 2026

(54) SECURE INTERCALATE MODULAR MESSAGE SOLUTION (SIMMS)

(71) Applicant: Wells Fargo Bank, N.A., San Francisco, CA (US)

(72) Inventors: Cary Simms, San Francisco, CA (US); Jeffrey J. Stapleton, O'Fallon, MO (US); Peter Bordow, Fountain Hills, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 426 days.

(21) Appl. No.: 18/207,595

(22) Filed: Jun. 8, 2023

(65) Prior Publication Data
US 2024/0414140 A1 Dec. 12, 2024

(51) Int. Cl.
*H04L 9/40* (2022.01)

(52) U.S. Cl.
CPC ...... *H04L 63/0471* (2013.01); *H04L 63/0464* (2013.01)

(58) Field of Classification Search
CPC ............. H04L 63/0471; H04L 63/0464; H04L 63/0428
See application file for complete search history.

(56) References Cited

U.S. PATENT DOCUMENTS

| | | | | |
|---|---|---|---|---|
| 5,915,024 | A * | 6/1999 | Kitaori | H04L 9/3247 |
| | | | | 707/999.102 |
| 9,495,240 | B2 * | 11/2016 | Grube | H04L 9/14 |
| 10,824,737 | B1 * | 11/2020 | Guyomarc'h | H04L 9/0625 |
| 12,413,392 | B2 * | 9/2025 | Jain | H04L 9/0894 |
| 2008/0098217 | A1 * | 4/2008 | Pletka | G06F 21/6218 |
| | | | | 713/181 |
| 2015/0052388 | A1 * | 2/2015 | Grube | G06F 11/1004 |
| | | | | 714/6.24 |
| 2015/0121062 | A1 * | 4/2015 | Gajek | G06F 21/606 |
| | | | | 713/153 |
| 2020/0153611 | A1 * | 5/2020 | Lim | H04L 9/0825 |
| 2020/0265159 | A1 * | 8/2020 | Schmatz | H04L 9/008 |
| 2024/0121662 | A1 * | 4/2024 | Zewail | H04L 25/0202 |
| 2024/0143796 | A1 * | 5/2024 | Guyomarc'h | H04L 9/0825 |

* cited by examiner

*Primary Examiner* — Khalid M Almaghayreh
(74) *Attorney, Agent, or Firm* — Foley & Lardner LLP

(57) ABSTRACT

The present disclosure is directed to systems, methods, and non-transitory computer-readable media for generating, by a first node, an encrypted protected message. Generating the encrypted protected message includes generating an obfuscated message by intercalating a second message into the first message, generating a protected message by applying a plurality of data protection mechanisms to the obfuscated message, and generating the encrypted protected message by applying a plurality of confidentiality techniques to the protected message. The first node transmits to a second node the encrypted protected message using a plurality of communication channels.

19 Claims, 5 Drawing Sheets

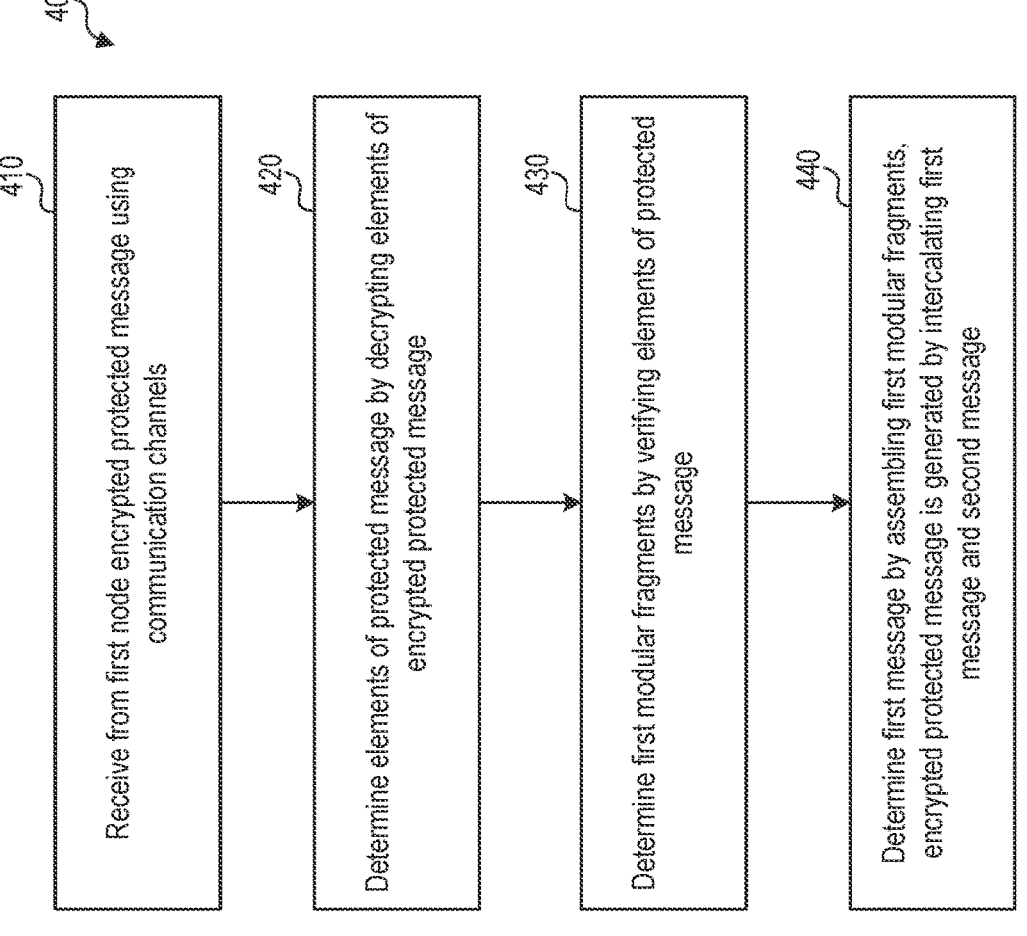

400

410
Receive from first node encrypted protected message using communication channels 420
Determine elements of protected message by decrypting elements of encrypted protected message 430
Determine first modular fragments by verifying elements of protected message 440
Determine first message by assembling first modular fragments, encrypted protected message is generated by intercalating first message and second message

FIG. 4

SECURE INTERCALATE MODULAR MESSAGE SOLUTION (SIMMS)

BACKGROUND

Commercially feasible data communication methods for transmitting data between two network nodes are typically performed over a single communication channel, using a simple mixture of data protection mechanisms for one or more messages per communication channel. This includes two network nodes communicating with each other by sending and receiving encrypted data over a communication channel. A bad actor might capture the encrypted data over the communication channel and determine the encryption key using cryptanalysis methods. When the key is determined in real-time, this is typically called a "compromised communication channel," but when the key is determined afterwards, this is sometimes called a "harvest now and decrypt later" (HNDL) attack. Thus, conventional data communication methods are exposed to the risks of data loss, identity loss, and fraud given that a bad actor may be capable of intercepting and decrypting the encrypted data.

SUMMARY

The arrangements disclosed herein relate to systems, methods, non-transitory computer-readable media, apparatuses for generating, by a first node, an encrypted protected message. Generating the encrypted protected message includes generating an obfuscated message by intercalating a second message into the first message, generating a protected message by applying a plurality of data protection mechanisms to the obfuscated message, and generating the encrypted protected message by applying a plurality of confidentiality techniques to the protected message. The first node transmits to a second node the encrypted protected message using a plurality of communication channels.

These and other features, together with the organization and manner of operation thereof, will become apparent from the following detailed description when taken in conjunction with the accompanying drawings.

BRIEF DESCRIPTION OF THE DRAWINGS

FIG. 4 is a flowchart diagram illustrating a method for providing SIMMS for data communication, according to various arrangements.

DETAILED DESCRIPTION

The arrangements disclosed herein relate to systems, apparatuses, non-transitory computer-readable media, and methods for dividing, partitioning, or separating an encrypted and/or signed data and transmitting the separated encrypted and/or signed data using multiple communication channels and intercalate methods. In some arrangements, data protection methods are deployed on multiple communication channels over public or private networks for securely transmitting data between two participating nodes. For example, a first node can send a message (e.g., data) to a second node by dividing the message into modular fragments with discrete data protection mechanisms over multiple channels. The second node can reassemble the modular fragments and validate the discrete data protected packets with authenticity. The first node can include additional data confidentiality using various techniques on some or all of the modular fragments. The arrangements disclosed herein can accordingly reduce the risk of capture and of data.

Figure 1:
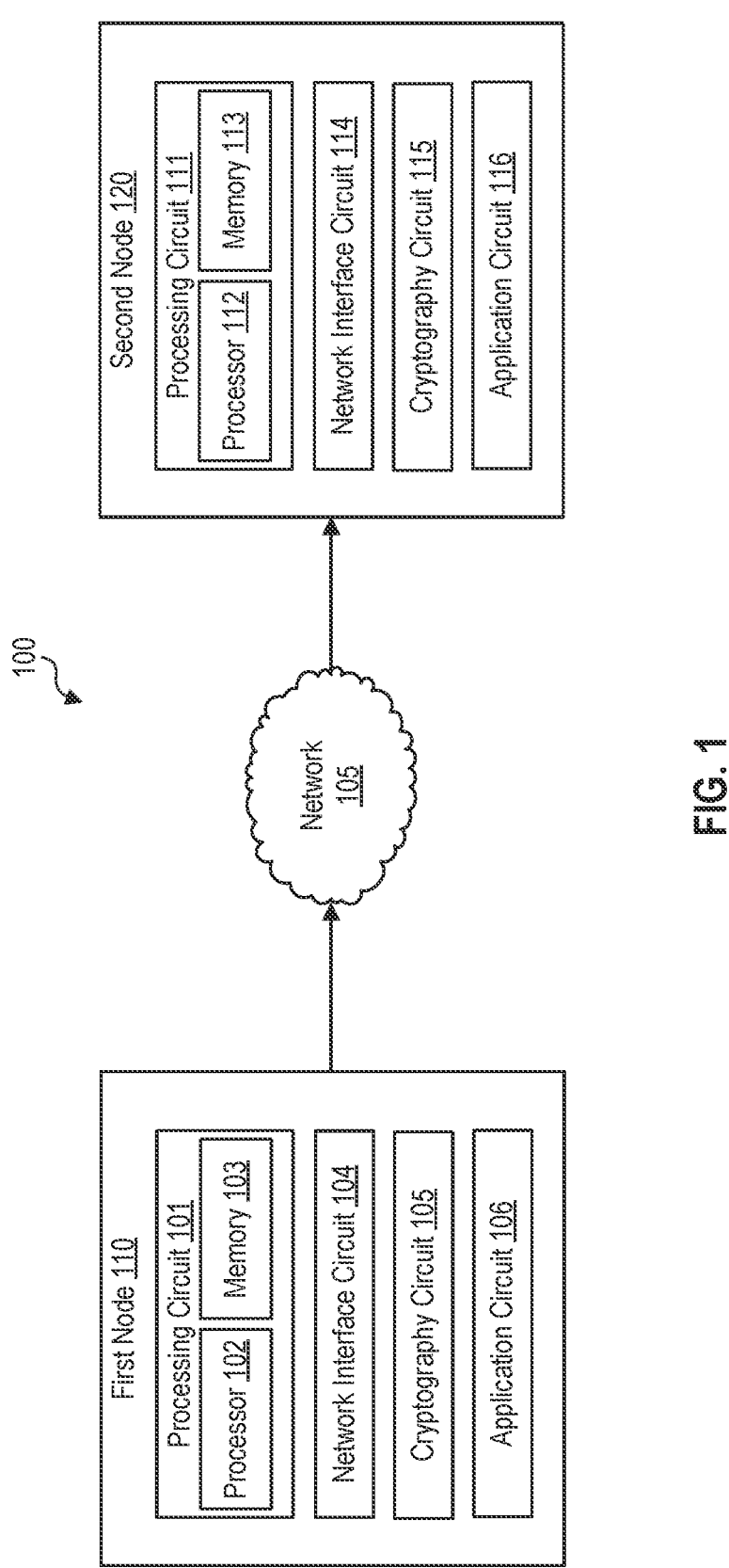
FIG. 1 is a system configured for providing Secure Intercalate Modular Message Solution (SIMMS) for data communication, according to various arrangements.

FIG. 1 is a system 100 configured for providing SIMMS for data communication, according to various arrangements. The system 100 includes a first node 110 and a second node 120. The first node 110 refers to a sender of a message (e.g., data, information, values, instructions, parameters signals, and so on) over the network 105, and the second node 120 refers to a receiver of the message. Although FIG. 1 shows that the first node 110 can send a message over the network 105 to the second node 120, the second node 120 can likewise send a message over the network 105 to the first node 110 using the same mechanisms described. In that regard, the first node 110 refers to any node from which the message is sent, and the second node 120 refers to any node to which the message is sent. In some examples, each of the first node 110 and the second node 120 can include a computing system, a server, a datacenter, a user device, a User Equipment (UE), a wireless communication device, and so on.

The network 105 is structured to permit the exchange of the message. For example, the network 105 can include the Internet, a Radio Frequency (RF) network, a cellular network, a satellite link, a quantum network, an optical network, a laser network, a physical network or connection, and so on. The message can be transmitted via the Internet, RF, and cellular networks, RF signals, cellular signals, satellite signals, quantum bits or qubits, fiber optic signals, laser signals, and so on. The network 105 can include any suitable Local Area Network (LAN), Wide Area Network (WAN), or a combination thereof. For example, the network 105 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. The message can be divided into one or more data packets dependent on the network protocol such as Transmission Control Protocol (TCP)/Internet Protocol (IP), User Datagram Protocol (UDP)/IP, and so on.

The first node 120 and the second node 120 are shown to include various circuits and logic for implementing the operations described herein. More particularly, the first node 110 includes one or more of a processing circuit 101, a network interface circuit 104, a cryptography circuit 105, and an application circuit 106. The second node 120 includes one or more of a processing circuit 111, a network interface circuit 114, a cryptography circuit 115, and an application circuit 116. While various circuits, interfaces, and logic with particular functionality are shown, it should be understood that the first node 120 and the second node 120 can include any number of circuits, interfaces, and logic for facilitating the operations described herein. For example, the activities of multiple circuits can be combined as a single circuit and implemented on a same processing circuit (e.g., the processing circuits 101 and 111), as additional circuits with additional functionality are included.

In some arrangements, the processing circuit 101 includes a processor 102 and a memory 103. The processor 102 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 103 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 103 is or includes tangible, non-transient volatile memory or non-volatile memory. Accordingly, the memory 103 includes database components, object code components, script components, or any other type of information structure for supporting the various activities and information structures described herein. The processing circuit 101 can be used to implemented one or more of the circuits 104, 105, or 106.

The network interface circuit 104 is configured for and structured to establish a connection and communicate with the second node 120 via the network 105 or another suitable wired, wireless, or physical connection. In some examples, the network interface circuit 104 is configured for and structured to transmit the message or the data corresponding thereto to the second node 120. Accordingly, the network interface circuit 104 includes any of a cellular transceiver or transmitted (for cellular standards), wireless network transceiver or transmitted (for 802.11X, ZigBee, Bluetooth, Wi-Fi, or the like), wired network interface, RF transceiver or transmitter, satellite signal transceiver or transmitter, a quantum processor or quantum transmitter, a fiber optics transceiver or transmitter, a laser transceiver or transmitter, or a combination thereof. For example, the network interface circuit 104 may include wireless or wired network modems, ports, baseband processors, and associated software and firmware. The network interface circuit 104 can transmit the message over multiple channels of the network 105, such as using Frequency-Hopping Spread Spectrum (FHSS) scheme.

The application circuit 106 can be used to execute one or more applications or software on the first node 110 for which the message needs to be transmitted to the second node 120. For example, the application circuit 106 can execute one or more applications that generate the message to be transmitted to the host 120. For example, the application circuit 106 can execute a mobile banking application, a browser, a word processing application, a mobile banking application, a mobile wallet, and so on that generate the message to be transmitted in the manner described herein.

The cryptography circuit 105 is executed by the processing circuit 101 or a separate processing circuit similar to the processing circuit 101. The cryptography circuit 105 can perform cryptographic operations such as generating an encrypted protected message based on the message (referred to as the first message) provided or outputted by the application circuit 106, in the manner described. The cryptography circuit 105 can perform other cryptographic operations such as generating a cryptographic signature. For example, the cryptography circuit 105 can divide the first message into first modular fragments, intercalate second modular fragments of a second message (e.g., a null message) into the first modular fragments of the first message to generate an intercalated message (e.g., an obfuscated message), applying one or more data protection mechanisms to the intercalated message to generate a protected message, applying one or more confidentiality techniques to the protected message to generate the encrypted protected message, and so on.

In some arrangements, the processing circuit 111 has a processor 112 and memory 113. The processor 111 is a processing component such as the processor 101. The memory 113 is a memory device such as the memory 103. The processing circuit 111 can be used to implemented one or more of the circuits 114, 115, and 116.

The network interface circuit 114 is configured for and structured to establish a connection and communicate with the first node 110 via the network 105 or another suitable wired, wireless, or physical connection. In some examples, the network interface circuit 114 is configured for and structured to transmit the message or the data corresponding thereto to the first node 110. Accordingly, the network interface circuit 114 includes any of a cellular transceiver or receiver (for cellular standards), wireless network transceiver or receiver (for 802.11X, ZigBee, Bluetooth, Wi-Fi, or the like), wired network interface, RF transceiver or receiver, satellite signal transceiver or receiver, a quantum processor or quantum receiver, a fiber optics transceiver or receiver, a laser transceiver or receiver, or a combination thereof. For example, the network interface circuit 114 may include wireless or wired network modems, ports, baseband processors, and associated software and firmware. The network interface circuit 114 can receive the message over multiple channels of the network 105.

The cryptography circuit 115 can be implemented with the processing circuit 111 or a separate processing circuit similar to the processing circuit 111. The cryptography circuit 115 can perform cryptographic operations such as decrypting the received data corresponding to the protected message, verifying the one or more data protection mechanisms, identifying the first and second modular messages, and reassembling the first modular messages.

The application circuit 116 can be used to execute one or more applications or software on the second node 120 for which the message of the first node 110 needs to be received, decrypted, validated, checked, accessed, obtained, and/or processed. For example, the application circuit 116 can execute one or more applications that use verified or authenticate the message of the first node 110 as input to generate an output or a decision. For example, the application circuit 116 can execute a server application for a mobile banking platform, a browser, a word processing, a mobile banking platform, a mobile wallet platform, and so on.

Figure 2:
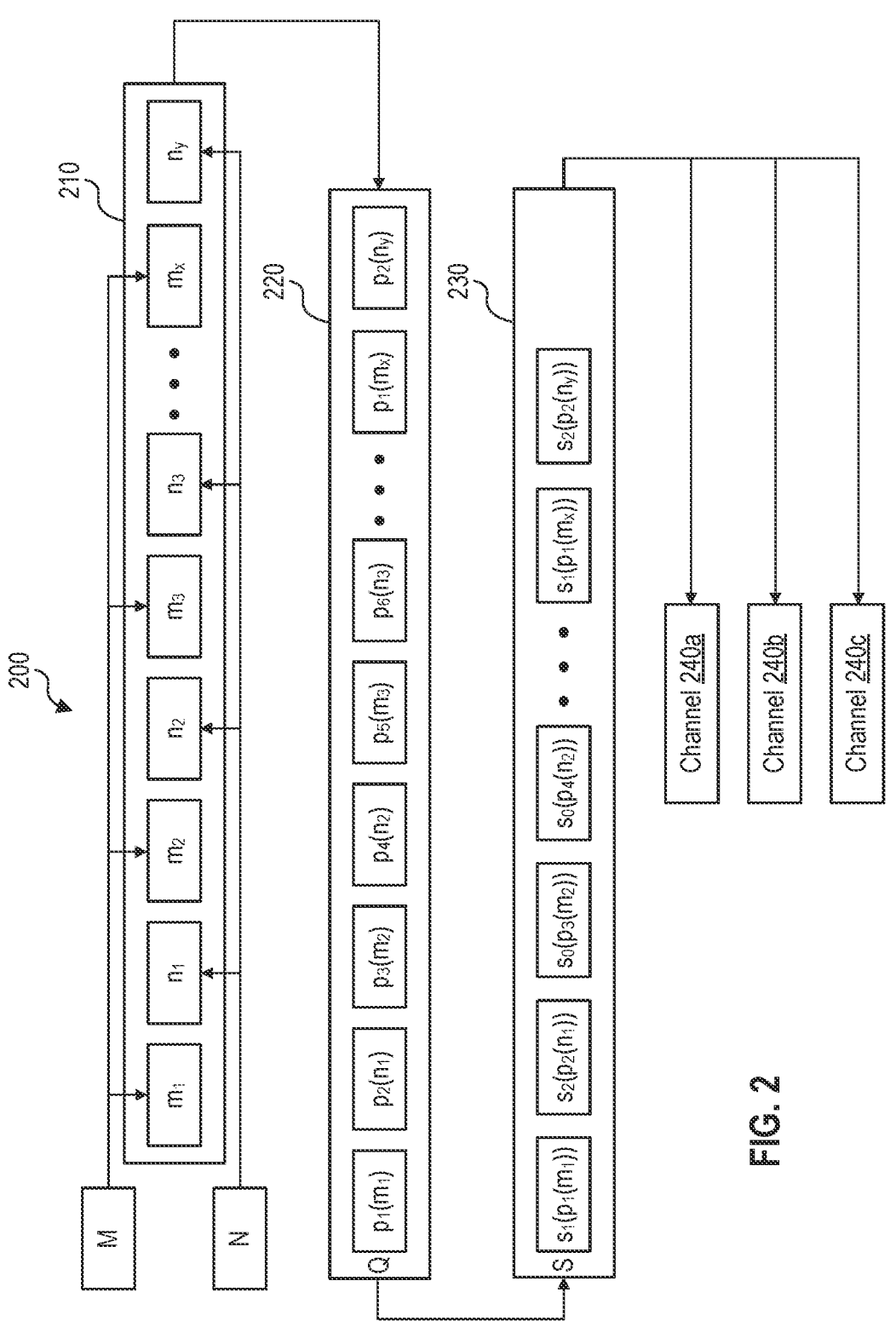
FIG. 2 is a block diagram illustrating a method for providing SIMMS for data communication, according to various arrangements.

FIG. 2 is a diagram illustrating an example method 200 for generating and transmitting an encrypted protected message, according to various arrangements. The method 200 can be performing using the system 100. The first node 110 can transmit a message M, referred to as a first message, to the second node 120 using the method 200. The message M is generated by the application circuit 106 and is the data intended to be transmitted to the second node 120. For example, the first node 110 can generate an encrypted protected message 230 based on the message M and send the encrypted protected message 230 to the second node 120 through the network 105 via multiple channels (e.g., the channels 240a, 240b, and 240c). The message M can be intercalated with a message N, referred to as a second message. An example of the second message is a null message. The cryptography circuit 105 can generate the second message.

The first node 110 (e.g., the cryptography circuit 105) can divide (e.g., partition, separate, splits, or so on) the message M into a plurality of first modular fragments. The number of the first modular fragments can be referred to as x. That is, $M=\{m_1, m_2, m_3, \ldots, m_x\}$. In some examples, the message M can be divided according to size, such that each first modular fragment can have a same size. In some examples, all first modular fragments have the same size. In some examples, all first modular fragments except one modular fragments have the same size.

The first node 110 (e.g., the cryptography circuit 105) can divide (e.g., partition, separate, splits, or so on) the message N into a plurality of second modular fragments. The number of the second modular fragments can be referred to as y. That is, $N=\{n_1, n_2, n_3, \ldots, n_x\}$. In some examples, the message N can be divided according to size, such that each second modular fragment can have a same size. In some examples, the size of a first modular fragment can be the same as the size of a second modular fragment. In some examples, the size of a first modular fragment can be different from the size of a second modular fragment. In the examples shown, x=y. In other examples, x can be different from y.

The first node 110 (e.g., the cryptography circuit 105) can generate an intercalated message 210 (e.g., an obfuscated message) by intercalating the second message into the first message. The intercalated message 210 can include the plurality of second modular fragments interleaved or intermingled with plurality of first modular fragments That is, plurality of second modular fragments can be intercalated into the first modular fragments. For example, the first node 110 can inserting one of the plurality of second modular fragments between two of the plurality of first modular fragments. For example, the first node 110 can inserting a second modular fragment and another second modular fragment before and after a first modular fragment. For example, the first node 110 can insert each of the plurality of second modular fragments after a respective one of the plurality of first modular fragments. For example, the first node 110 can insert each of the plurality of second modular fragments before a respective one of the plurality of first modular fragments. Accordingly, the resulting intercalated message 210 includes message fragments including first modular fragments mixed with the second modular fragments.

In some arrangements, the order or sequential arrangement of the first modular fragments $m_i$ and the second modular fragments $m_i$ in the intercalated message 210 (and therefore in the protected message 220 and the encrypted protected message 230) may be irrelevant or insignificant given that the first modular fragments and the second modular fragments are self-identifying using a predetermined identification scheme. For example, each first modular fragment can include a suitable identifier (e.g., a sequence number 1, 2, . . . , x) that indicates a position of the first modular fragment in the first message M. Such identifiers (referred to as sequence identifiers) can be used by the second node 120 to reassemble the first message M. For example, each second modular fragment can include a suitable sequence identifier (e.g., a sequence number 1, 2, . . . , y) that indicates a position of the second modular fragment in the second message N. Therefore, while FIG. 2 shows that the first modular fragments and the second modular fragments are arranged in the intercalated message 210 (and therefore in the protected message 220 and the encrypted protected message 230) from sequence numbers 1-x and 1-y respectively, the first modular fragments and the second modular fragments can be arranged in the intercalated message 210 (and therefore in the protected message 220 and the encrypted protected message 230) in other sequences.

The first node 110 (e.g., the cryptography circuit 105) can generated a protected message 220 denoted as Q by applying varying data protection mechanisms denoted as P to the intercalated message 210 (e.g., to each of the first and second modular fragments in the intercalated message 210). The number of the data protection mechanisms can be referred to as z. That is, $P=\{p_1, p_2, p_3, \ldots, p_z\}$. As shown, a first data protection mechanism $p_1$ is applied to first modular fragment $m_1$, a second data protection mechanism $p_2$ is applied to second modular fragment $n_1$, a third data protection mechanism $p_3$ is applied to first modular fragment $m_2$, a fourth data protection mechanism $p_4$ is applied to second modular fragment $n_2$, a fifth data protection mechanism $p_5$ is applied to first modular fragment $m_3$, a sixth data protection mechanism $p_6$ is applied to second modular fragment $n_3$, and so on. The data protection mechanisms can be applied to the modular fragments in the intercalated message 210 cyclically. That is, the data protection mechanism $p_1, p_2, p_3, \ldots, p_z$ can be applied in that order until $p_z$ is applied to a modular fragment, and $p_1$ is applied to the following modular fragment. As shown, the first data protection mechanism $p_1$ is applied to first modular fragment $m_x$, and the second data protection mechanism $p_2$ is applied to second modular fragment $n_y$. The resulting protected message 220 can be expressed as $P=\{p_1(m_1), p_2(n_1), p_3(m_2), p_4(n_2), p_5(m_3), p_6(n_3), \ldots, p_1(m_x), p_2(n_y)\}$. In some arrangements, instead of applying the data protection mechanisms cyclically according to a static sequence (e.g., $p_1, p_2, p_3, \ldots, p_z$ in that order), the data protection mechanisms can be randomly applied to the modular fragments.

Examples of each of the data protection mechanisms include Message Authentication Code (MAC), Hash-based Message Authentication Code (HMAC), digital signature, and so on. In some examples, as a chaffing scheme, the result of applying a respective data protection mechanism to a second modular fragment (e.g., a null message modular fragment) is invalid. In some examples, first node 110 (e.g., the cryptography circuit 105) uses a first cryptographic key (e.g., a first private key) to protect (e.g., sign) a first modular fragment and uses a second cryptographic key (e.g., a second private key) to protect (e.g., sign) a second modular fragment, where the first and second cryptographic keys are different. As such, the second node 120 can use a first public key corresponding to the first private key to verify the data protection mechanisms (e.g., the signature) on the first modular fragment and a second public key corresponding to the second private key to verify the data protection mechanisms (e.g., the signature) on the second modular fragment.

In some arrangements, the order of the data protection mechanisms $p_i$ applied to the modular fragments in the protected message 220 may be irrelevant or insignificant given that the data protection mechanisms $p_i$ are self-identifying using a predetermined identification scheme. For example, each element p(m) or p(n) in the protected message 220 can include a suitable identifier (referred to as protection mechanism identifier) that identifies the data protection mechanisms $p_i$ applied to the modular fragment m or n. For example, MAC can be identified by identifier 1, HMAC can be identified using identifier 2, and digital signature can be identified using identifier 3. Thus, the same protection mechanism (e.g., $p_1$ and $p_2$) can be reused for different first and second modular fragments.

The first node 110 (e.g., the cryptography circuit 105) can generate the encrypted protected message 230 denoted as S by applying plurality of confidentiality techniques to the protected message 220 (e.g., to at least some or all of the elements p(m) or p(n) in the protected message 220). Examples of the confidentiality techniques include steganography and encryption. In steganography, each element of the protected message 220 is hidden as a secret message within a larger message to disallow an adversary to discern the presence or contents of the secret message e. For example, each element of the protected message 220 can be hidden within a picture by changing the low-order pixel bits to be the message bits. In encryption, each element of the protected message 220 is transformed into ciphertext. The second node 120 can have access to the secret decryption key that allows the second node 120 to reverse the encryption transformation and retrieves the element. The first node 110 can use the same key to encrypt the element of the protected message (with symmetric encryption schemes) or used a different, but related key (with public-key schemes). Examples of the confidentiality techniques include data encryption with varying key management methods and encryption schemes. Examples of confidentiality techniques include Cryptographic Message Syntax (CMS) Enveloped Data, Named Key Encrypted Data, Advanced Encryption Standard (AES), Rivest-Shamir-Adleman (RSA), ChaCha20, and so on. For example, AES is an encryption algorithm. ChaCha20-Poly 1305 is an Authenticated Encryption with Additional Data (AEAD) algorithm that combines the ChaCha20 stream cipher with the Poly 1305 message authentication code. The confidentiality techniques prevents a malicious actor from gaining intelligence in a transmitted message.

CMS is a scheme for constructing cryptographically protected data (e.g., the elements of the encrypted protected message 230), including data encryption, message authentication, digital signatures, and the corresponding key management supporting a sender and one or more receivers (e.g., one or more second nodes 120). CMS is defined for example in the ANSI standard X9.73Cryptographic Message Syntax: ASN.1 and XML and in the IETF specification RFC 5652 Cryptographic Message Syntax (CMS). The first node 110 can utilize CMS Enveloped Data for multiple recipients (e.g., multiple second nodes 120) or for multiple asymmetric key pairs for the same recipient (e.g., the second node 120).

With regard to enveloped data, an enveloped-data message includes encrypted message content (e.g., the elements of the encrypted protected message 230) and key management information for each recipient (e.g., the second node 120). The content is encrypted under a symmetric Content-Encryption Key (CEK). The CEK can be encrypted under public key or a shared symmetric key of each recipient. The CEK can be included in the key management information. Any type of content can be enveloped for any number of recipients (e.g., multiple second nodes 120).

With regard to Named Key Encrypted Data, a named-key-encrypted-data message includes content (e.g., the elements of the encrypted protected message 230) encrypted with a single key and the key name. The name of the key is given in the keyName component of type NamedKeyEncryptedData. The result of encrypting the content is carried in the encryptedContentInfo component along with an identifier of the encryption algorithm used and the type of content encrypted. Optionally, unprotected attributes may also be included.

The encrypted protected message 230 can be represented as for example, $S=\{s_1(p_1(m_1)),\ s_2(p_2(n_1)),\ s_0(p_3(m_2)),\ s_0(p_4(n_2)),\ \ldots,\ s_1(p_1(m_x)),\ s_2(p_2(n_y))\}$, where $s_0$ denotes cleartext and $s_i$ for $i>0$ denotes ciphertext. That is, $s_0$ refers to no confidentiality techniques being applied to the corresponding elements p(m) or p(n), and $s_i$ for $i>0$ refers to a confidentiality techniques being applied to the corresponding elements p(m) and p(n).

In some arrangements, the order of the confidentiality techniques $s_i$ applied to the elements of the protected message 220 may be irrelevant or insignificant given that the confidentiality techniques $s_i$ are self-identifying using a predetermined identification scheme. For example, each element s(p(m)) or s(p(n)) in the encrypted protected message 230 can include a suitable identifier (referred to as a confidentiality technique identifier) that identifies the confidentiality techniques $s_i$ applied to the elements of the protected message 220. For example, AES can be identified by identifier 1, ChaCha20 can be identified using identifier 2, and so on. Thus, the same confidentiality techniques $s_1$ and $s_2$ can be reused for different elements of the protected message 220. In some arrangements, instead of applying the confidentiality techniques according to a static sequence (e.g., $s_1$, $s_2$, $s_0$, $s_0$ in that order), the confidentiality techniques can be randomly applied to the elements of the protected message 220.

The first node 110 (e.g., the network interface circuit 104) can transmits encrypted protected message to the second note 120 via the network 105, over multiple channels 240a, 240b, and 240c. For example, the first node 110 can transmit the elements s(p(m)) and s(p(n)) of the encrypted protected message 230 over the channels 240a, 240b, and 240c. Different elements of the encrypted protected message 230 can be transmitted over different ones of the channels 240a, 240b, and 240c. In some examples, at least one element of the encrypted protected message 230 is transmitted over the channel 240a, at least one element of the encrypted protected message 230 is transmitted over the channel 240b, and at least one element of the encrypted protected message 230 is transmitted over the channel 240c. While three channels are shown, the elements can be transmitted via any suitable number of channels.

In some examples, the elements of the encrypted protected message 230 can be transmitted using a Frequency-hopping spread spectrum (FHSS) scheme. FHSS is a mechanism for transmitting radio signals corresponding to the elements of the encrypted protected message 230 by changing carrier frequency among multiple frequencies over a band. The changes (e.g., hops) are determined based on a code known to transmitter (the first node 110) and receiver (the second node 120). Transmitting encrypted protected message 230 using FHSS can avoid interference and prevent eavesdropping. In some examples, the frequency-hopping pattern can be controlled using at least one session key that the nodes 110 and 120 share in advance. The session key may be generated using hardware equipment.

The second node 120 (e.g., the network interface circuit 114) receives the elements of the encrypted protected message 230 over the channels 240a, 240b, and 240c. Due to network conditions, the second node 120 can receive at least some or all of the elements of the encrypted protected message 230.

The second node 120 (e.g., the cryptography circuit 115) decrypts each element s(p(m)) or s(p(n)) of the encrypted protected message 230 according to the confidentiality tech-nique identifier that identifies the confidentiality techniques s$_i$ applied to that element. For example, the second node 120 decrypts an element received via one of the channels 240*a*, 240*b*, or 240*c* using the confidentiality technique (e.g., one of CMS Enveloped Data, Named Key Encrypted Data, encryption algorithm, AES, ChaCha20, and so on) identified by the confidentiality technique identifier. This allows the second node 120 to recover the elements p(m) and p(n) of the protected message 220.

The second node 120 (e.g., the cryptography circuit 115) verifies each element p(m) or p(n) of the protected message 220 according to the protection mechanism identifier that identifies the data protection mechanisms p$_i$ applied to that element. For example, the second node 120 verifies an element of the protected message 220 using the data pro-tection mechanism (e.g., one of MAC, HMAC, digital signature, and so on) identified by the protection mechanism identifier. This allows the second node 120 to recover the first modular fragments M and the second modular frag-ments N in some arrangements. The second modular frag-ments are disregarded.

In some examples, given that as a chaffing scheme, the result of applying a data protection mechanism to a second modular fragment (e.g., a null message modular fragment) is invalid, the second node 120 (e.g., the cryptography circuit 115) can identify any recovered element of the protected message 220 that is invalid is a second modular fragment, and therefore can be disregarded. An example chaffing scheme can be found in U.S. Pat. No. 10,735,403. In some examples, given that a data protection mechanism is applied to a second modular fragment using a cryptographic key (e.g., a private key) different from a cryptographic key used for the first modular fragments, the second node 120 (e.g., the cryptography circuit 115) can identify as a second modular fragment any recovered element of the protected message 220 that cannot be verified using a cryptographic key (e.g., a private key) corresponding to the cryptographic key used on the first modular fragment and/or can be verified using a cryptographic key (e.g., a private key) corresponding to the cryptographic key used on the second modular frag-ment.

The second node 120 (e.g., the cryptography circuit 115) can reassemble the first message according to the sequence identifiers included in the first modular fragments. The second node 120 can concatenate, add, or otherwise com-bine the received and recovered first modular fragments M in the sequence indicated by the sequence identifiers. For example, a first modular fragment M with a sequence number g is arranged immediately before first modular fragment M with a sequence number g+1.

Figure 3:
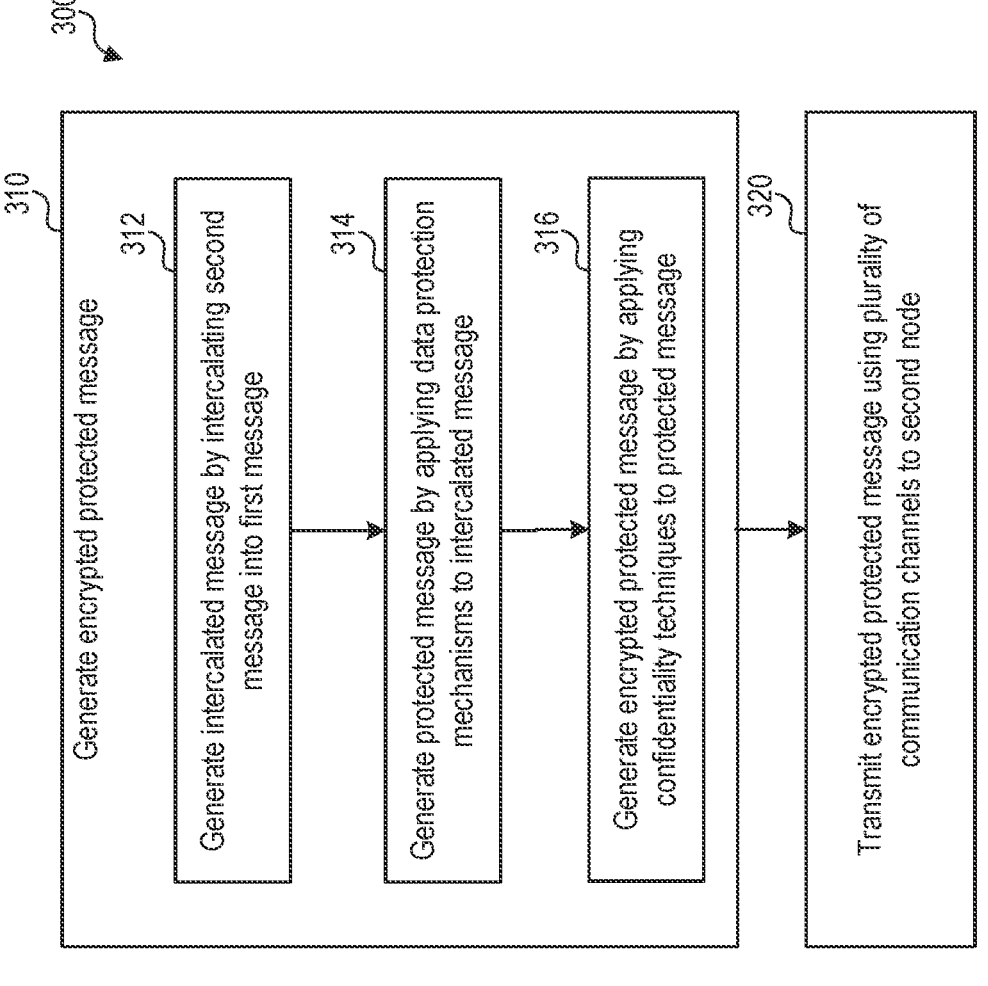
FIG. 3 is a flowchart diagram illustrating a method for providing SIMMS for data communication, according to various arrangements.

FIG. 3 is a flowchart diagram illustrating a method 300 for providing SIMMS for data communication, according to various arrangements. The method 300 can be performed using the system 100, by the first node 110. The method 200 is an example implementation of the method 300.

At 310, the first node 110 generates the encrypted pro-tected message 230. Generating the encrypted protected message 230 includes one or more of blocks 312, 314, and 316.

At 312, the first node 110 generates the intercalated message 210 by intercalating a second message N into the first message M. The first message includes data to be transmitted to the second node 120. The second message includes a null message. In some examples, intercalating the second message into the first message includes dividing the first message into a plurality of first modular fragments and dividing the second message into a plurality of second modular fragments. In some examples, the first node 110 inserts one of the plurality of second modular fragments between two of the plurality of first modular fragments. In some examples, the first node 110 inserts each of the plurality of second modular fragments after a respective one of the plurality of first modular fragments. In some examples, the intercalated message includes the plurality of second modular fragments interleaved or intermingled with plurality of first modular fragments.

At 314, the first node 110 generates the protected message (Q) 220 by applying a plurality of data protection mecha-nisms to the intercalated message 210. In some examples, the plurality of protection mechanisms includes one or more of a MAC, a HMAC, or a digital signature.

At 316, the first node 110 generates the encrypted pro-tected message(S) 230 by applying a plurality of confiden-tiality techniques to the protected message 220. In some examples, generating the encrypted protected message fur-ther includes applying the plurality of data protection mechanisms to the plurality of first modular fragments and the plurality of second modular fragments. In some examples, the plurality of confidentiality techniques includes one or more of CMS Enveloped Data, Named Key Encrypted Data, encryption algorithm, AES, RSA, DES, or ChaCha20.

At 320, the first node 110 transmits to the second node 120 the encrypted protected message 230 using a plurality of communication channels 240*a*, 240*b*, and 240*c*. In some examples, transmitting the encrypted protected message includes transmitting elements of the encrypted protected message using the plurality of communication channels.

Figure 5:
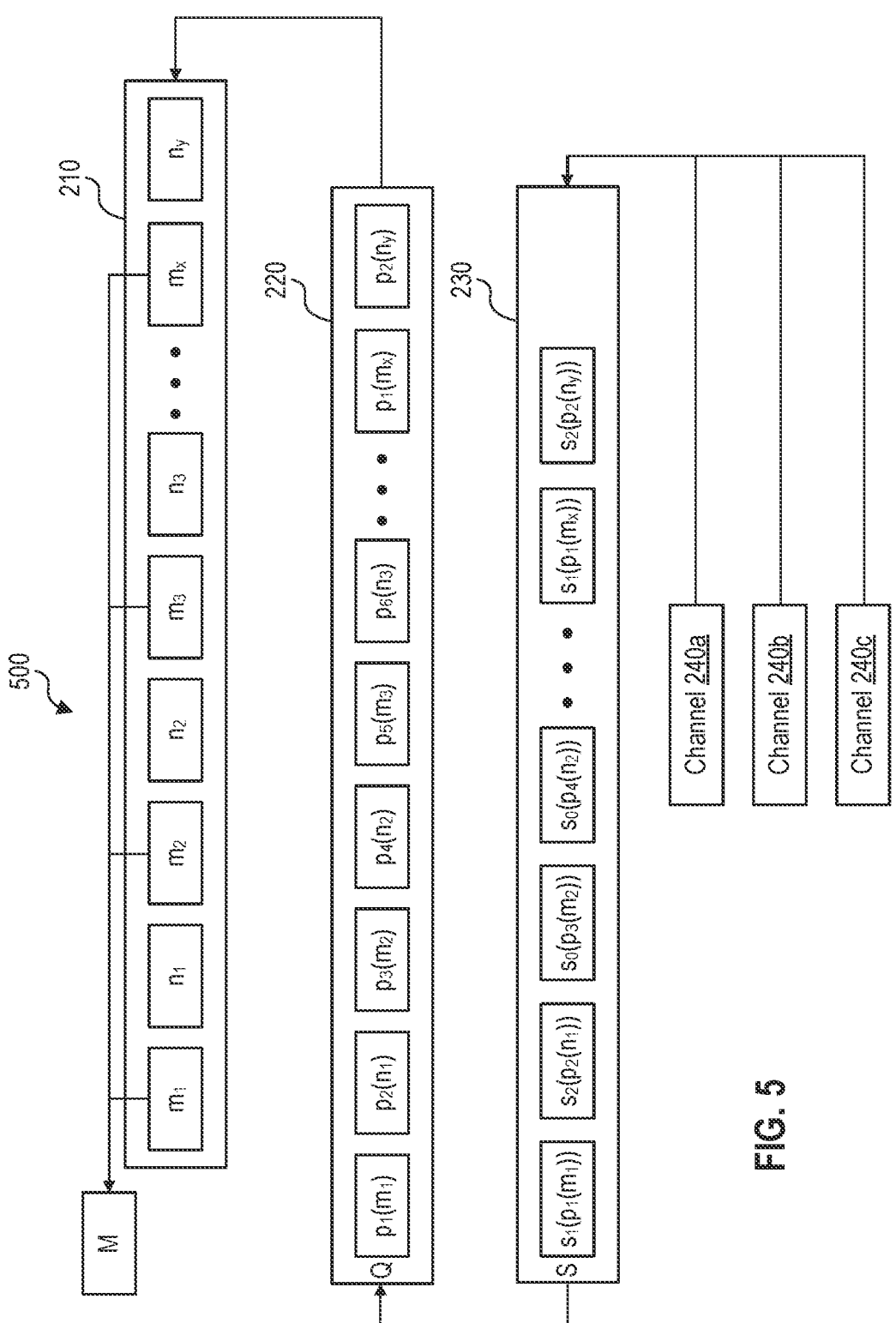
FIG. 5 is a block diagram illustrating a method for receiving SIMMS for data communication, according to various arrangements.

FIG. 4 is a flowchart diagram illustrating a method 400 for providing SIMMS for data communication, according to various arrangements. FIG. 5 is a diagram illustrating an example method 500 for receiving and processing an encrypted protected message, according to various arrange-ments. The methods 400 and 500 can be performed using the system 100, by the second node 120. The method 500 is an example implementation of the method 400. At 410, the second node 120 receives, from the first node, the encrypted protected message 230 using the plurality of communication channels 240*a*, 240*b*, and 240*c*.

At 420, the second node 120 determines elements of the protected message 220 by decrypting elements of the encrypted protected message 230. In some examples, each of the elements of the encrypted protected message 230 includes a confidentiality technique identifier that identifies a confidentiality technique of a plurality of confidentiality techniques applied to each of the elements of the encrypted protected message 230. Each of the elements of the encrypted protected message 230 is decrypted based on the confidentiality technique to obtain each of the elements of the protected message 220.

At 430, the second node 120 determines a plurality of first modular fragments by verifying the elements of the pro-tected message. In some examples, each of the elements of the protected message 220 includes a protection mechanism identifier that identifies a protection mechanism of a plural-ity of protection mechanisms applied to each of the elements of the protected message 230. Each of the elements of the protected message 220 is verified based on the protection mechanism identifier to obtain each of the plurality of first modular fragments.

At 440, the second node 120 determines the first message by assembling the plurality of first modular fragments. The encrypted protected message 230 is generated by intercalating the first message and the second message. In some examples, each of the plurality of first modular fragments is identified by a sequence identifier. The plurality of first modular fragments are assembled to form the first message according to the sequence identifier of each of the plurality of first modular fragments. In some examples, the second node 120 identifies that a plurality of second modular fragments of the second message based on the elements of the protected message 220. The plurality of second modular fragments are disregarded in assembling the plurality of first modular fragments.

In some examples, the second message includes plurality of second modular fragments. Intercalating the first message and the second message includes intercalating the plurality of first modular fragments and the plurality of first modular fragments. In some examples, the second node 120 determines that an element of the protected message 220 corresponds to a second modular fragment of the second message in response to determining that the element of the protected message 220 corresponds is invalid. In some examples, the second node 120 determines that an element of the protected message 220 corresponds to a second modular fragment of the second message in response to determining at least one of the element of the protected message 220 is verified using a cryptography key that is different from a cryptography key used to verify an element of the protected message 220 that corresponds to a first modular fragment of the plurality of first modular fragments or the element of the protected message 220 fails to be verified using a cryptography key used to verify an element of the protected message 220 that corresponds to a first modular fragment of the plurality of first modular fragments.

Accordingly, the arrangements described herein allow sensitive information to be transmitted over multiple communication channels 240a, 240b, and 240c with various data protection methods between two or more recipients (e.g., multiple second nodes 120). The implementations described herein concerning the first node 110 and the second node 120 can be likewise implemented for the communications between the first node 110 and other recipients (e.g., additional second nodes 120). Critical information can duplicated and then transmitted over the multiple communication channels to provide a high assurance of delivery. Data protection mechanisms include a mixture of confidentiality, integrity, authenticity, or nonrepudiation methods. Data protection mechanisms can vary by message or fragments of messages.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for transmitting a first message, comprising:
generating, by a first node, an encrypted protected message, wherein generating the encrypted protected message comprises:
generating an obfuscated message by intercalating a second message into the first message, wherein intercalating the second message into the first message comprises:
dividing the first message into a plurality of first modular fragments;
dividing the second message into a plurality of second modular fragments; and
inserting one of the plurality of second modular fragments between two of the plurality of first modular fragments;
generating a protected message by applying a plurality of data protection mechanisms to the obfuscated message; and
generating the encrypted protected message by applying a plurality of confidentiality techniques to the protected message; and
transmitting, by the first node to a second node, the encrypted protected message using a plurality of communication channels.

2. The method of claim 1, wherein
the first message comprises data to be transmitted to the second node; and
the second message comprises a null message.

3. The method of claim 1, wherein intercalating the second message into the first message comprises:
intermingling the first and second modular fragments.

4. The method of claim 1, wherein intercalating the second message into the first message comprises:
inserting each of the plurality of second modular fragments after a respective one of the plurality of first modular fragments.

5. The method of claim 3, wherein generating the encrypted protected message further comprises applying the plurality of data protection mechanisms to the plurality of second modular fragments intercalated into the plurality of first modular fragments.

6. The method of claim 1, wherein the plurality of protection mechanisms comprises one or more of a Message Authentication Code (MAC), a Hash-based Message Authentication Code (HMAC), or a digital signature.

7. The method of claim 1, wherein the plurality of confidentiality techniques comprises one or more of Cryptographic Message Syntax (CMS) Enveloped Data, Named Key Encrypted Data, encryption algorithm, Advanced Encryption Standard (AES), Rivest-Shamir-Adleman (RSA), Data Encryption Standard (DES), or ChaCha20.

8. The method of claim 1, wherein transmitting the encrypted protected message comprises transmitting elements of the encrypted protected message using the plurality of communication channels.

9. A method for recovering a first message originated from a first node, comprising:

receiving, by a second node from the first node, an encrypted protected message using a plurality of communication channels;

determining, by the second node, elements of a protected message by decrypting elements of the encrypted protected message;

determining, by the second node, a plurality of first modular fragments by verifying the elements of the protected message; and determining, by the second node, the first message by assembling the plurality of first modular fragments, wherein the encrypted protected message is generated by intercalating the first message and a second message, wherein the first message and the second message are intercalated by:

dividing the first message into the plurality of first modular fragments;

dividing the second message into a plurality of second modular fragments; and inserting one of the plurality of second modular fragments between two of the plurality of first modular fragments.

10. The method of claim 9, wherein each of the elements of the encrypted protected message comprises a confidentiality technique identifier that identifies a confidentiality technique of a plurality of confidentiality techniques applied to each of the elements of the encrypted protected message; and each of the elements of the encrypted protected message is decrypted based on the confidentiality technique to obtain each of the elements of the protected message.

11. The method of claim 9, wherein each of the elements of the protected message comprises a protection mechanism identifier that identifies a protection mechanism of a plurality of protection mechanisms applied to each of the elements of the protected message; and each of the elements of the protected message is verified based on the protection mechanism identifier to obtain each of the plurality of first modular fragments.

12. The method of claim 9, wherein each of the plurality of first modular fragments is identified by a sequence identifier; and the plurality of first modular fragments are assembled to form the first message according to the sequence identifier of each of the plurality of first modular fragments.

13. The method of claim 9, wherein the second message comprises the plurality of second modular fragments; and intercalating the first message and the second message comprises intercalating the plurality of first modular fragments and the plurality of second modular fragments.

14. The method of claim 9, further comprising determining, by the second node, that an element of the protected message corresponds to a second modular fragment of the second message in response to determining that the element of the protected message is invalid.

15. The method of claim 9, further comprising determining, by the second node, that an element of the protected message corresponds to a second modular fragment of the second message in response to determining at least one of:

the element of the protected message is verified using a cryptography key that is different from a cryptography key used to verify an element of the protected message that corresponds to a first modular fragment of the plurality of first modular fragments; or the element of the protected message fails to be verified using a cryptography key used to verify an element of the protected message that corresponds to a first modular fragment of the plurality of first modular fragments.

16. The method of claim 9, further comprising identifying the plurality of second modular fragments of the second message based on the elements of the protected message, wherein the plurality of second modular fragments are disregarded in assembling the plurality of first modular fragments.

17. At least one non-transitory computer-readable medium comprising processor-readable instructions such that, when executed causes at least one processor to:

generate an encrypted protected message, wherein generating the encrypted protected message comprises:

generate an obfuscated message by intercalating a second message into the first message, wherein intercalating the second message into the first message comprises:

dividing the first message into a plurality of first modular fragments;

dividing the second message into a plurality of second modular fragments; and inserting one of the plurality of second modular fragments between two of the plurality of first modular fragments;

generate a protected message applying a plurality of data protection mechanisms to the obfuscated message; and generating the encrypted protected message by applying a plurality of confidentiality techniques to the protected message; and transmit, to a second node, the encrypted protected message using a plurality of communication channels.

18. The at least one non-transitory computer-readable medium of claim 17, wherein the first message comprises data to be transmitted to the second node; and the second message comprises a null message.

19. The at least one non-transitory computer-readable medium of claim 17, wherein intercalating the second message into the first message comprises:

intermingling the first and second modular fragments.

* * * * *